United States Patent
Shoobe et al.

(10) Patent No.: US 6,725,310 B2
(45) Date of Patent: Apr. 20, 2004

(54) SCALABLE DOCKING ARCHITECTURE TO SUPPORT VARIOUS BANDWIDTH

(75) Inventors: Howard A. Shoobe, Austin, TX (US); LaVaughn F. Watts, Jr., Austin, TX (US); James Leftwich, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 452 days.

(21) Appl. No.: 09/771,047

(22) Filed: Jan. 26, 2001

(65) Prior Publication Data

US 2003/0200370 A1 Oct. 23, 2003

(51) Int. Cl.[7] .............................................. G06F 13/00
(52) U.S. Cl. ...................... 710/303; 710/100; 710/109; 710/11; 710/62; 713/322
(58) Field of Search .............................. 710/303, 11, 62, 710/100, 109; 713/322

(56) References Cited

U.S. PATENT DOCUMENTS

| | | | | | |
|---|---|---|---|---|---|
| 5,504,757 | A | * | 4/1996 | Cook et al. ................. | 370/468 |
| 5,892,926 | A | * | 4/1999 | Witkowski et al. ......... | 710/100 |
| 5,941,965 | A | * | 8/1999 | Moroz et al. ............... | 710/303 |
| 6,138,180 | A | * | 10/2000 | Zegelin ........................ | 710/11 |
| 6,161,157 | A | * | 12/2000 | Tripathi et al. ............. | 710/109 |
| 6,170,026 | B1 | * | 1/2001 | Kimura et al. ................ | 710/62 |
| 6,178,474 | B1 | * | 1/2001 | Hamano et al. ............. | 710/303 |
| 6,212,590 | B1 | * | 4/2001 | Melo et al. .................. | 710/119 |
| 6,256,691 | B1 | * | 7/2001 | Moroz et al. ............... | 710/303 |
| 6,549,968 | B1 | * | 4/2003 | Hart ........................... | 710/303 |
| 6,567,876 | B1 | * | 5/2003 | Stufflebeam ................ | 710/303 |
| 6,601,179 | B1 | * | 7/2003 | Jackson et al. ............. | 713/322 |

* cited by examiner

*Primary Examiner*—Gopal C. Ray
*Assistant Examiner*—Justin King
(74) *Attorney, Agent, or Firm*—Haynes and Boone, LLP

(57) ABSTRACT

Customer requirements for portable computers are grouped into logical functional groupings, which are further grouped into logical bandwidth levels. On the notebook side, all required signals for a specific logical functional grouping are combined into a single carrier with the necessary bandwidth for the signals within the logical bandwidth level. This combined signal is then passed through a docking connector. The individual signals are regenerated on the docking solution side of the connector. Logic on both the notebook and docking solution sides of the connector enables the respective devices to identify which carrier bandwidths are supported on both sides of the docking connector and settle on the greatest common denominator. Additionally, the signals combined into the carrier can be programmed, in which case the docking solution and the notebook negotiate the features that are and are not supported in each individual case.

26 Claims, 4 Drawing Sheets

| FUNCTIONAL GROUPING | CUSTOMER REQUIRED FUNCTIONS | BANDWIDTH LEVEL |
|---|---|---|
| SIMPLE PORT REPLICATION | REPLICATION OF ALL PORTS ON THE NOTEBOOK (e.g., PARALLEL, SERIAL, PS/2, VGA, USB) | LOW (e.g., 5 Mbytes/s) |
| PCI DOCKING | PCI BUS, IEE 1394 | MEDIUM (e.g., 500 Mbytes/s) |
| DESKTOP REPLACEMENT | AGP BUS GIGABIT ETHERNET | HIGH (e.g., 5 Gbytes/s) |

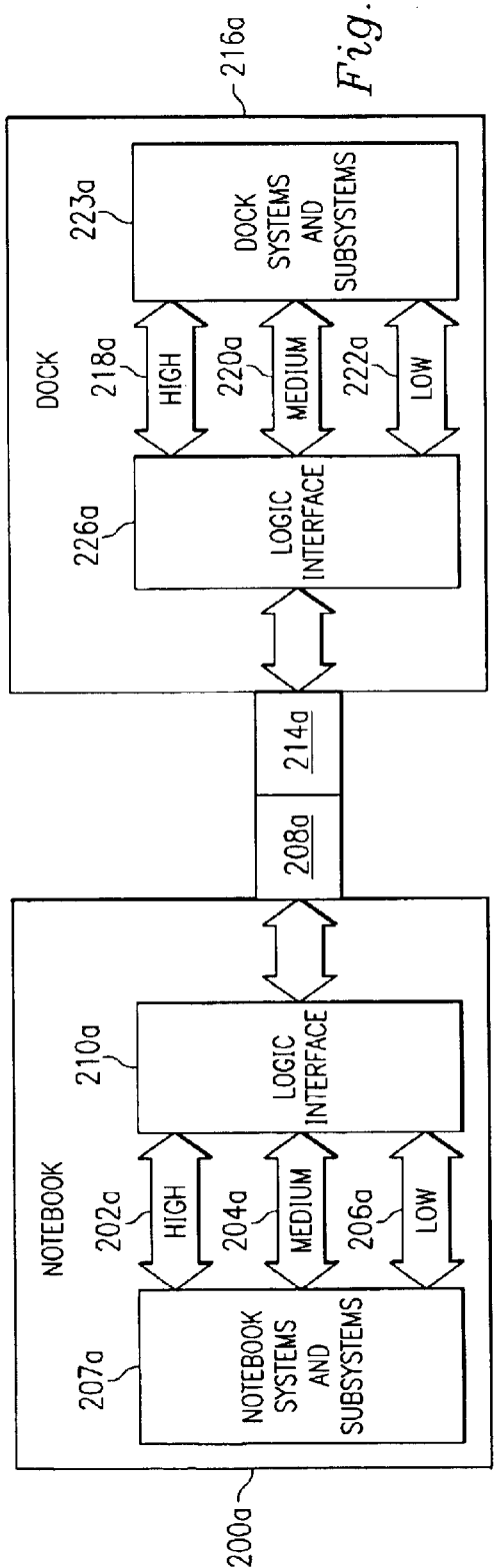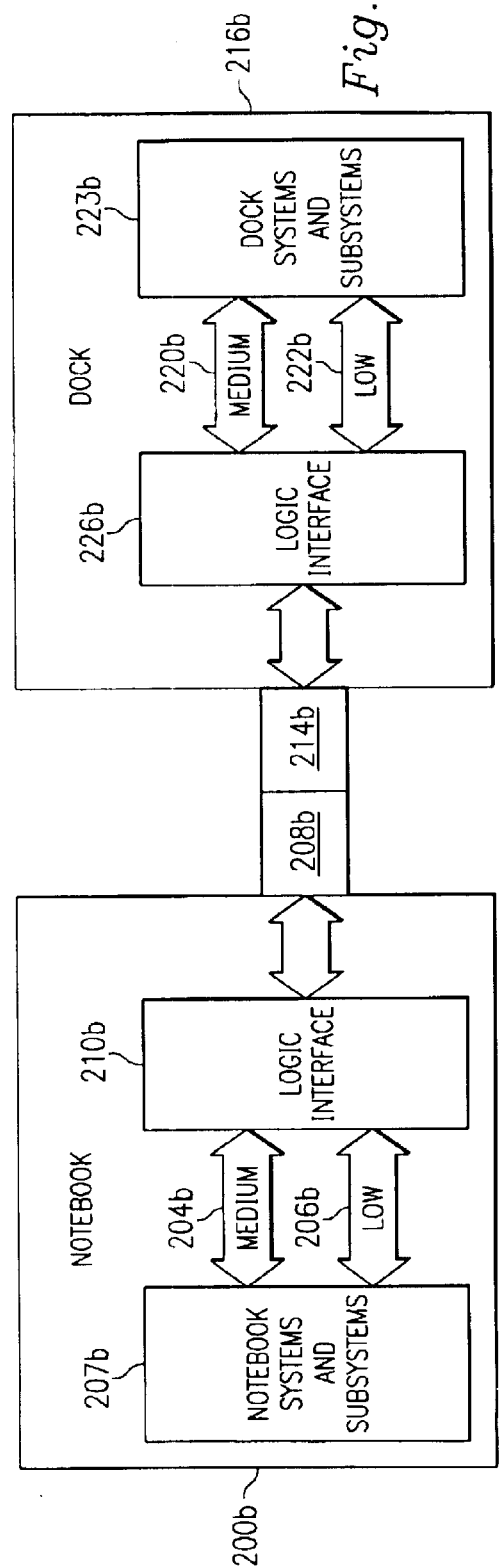

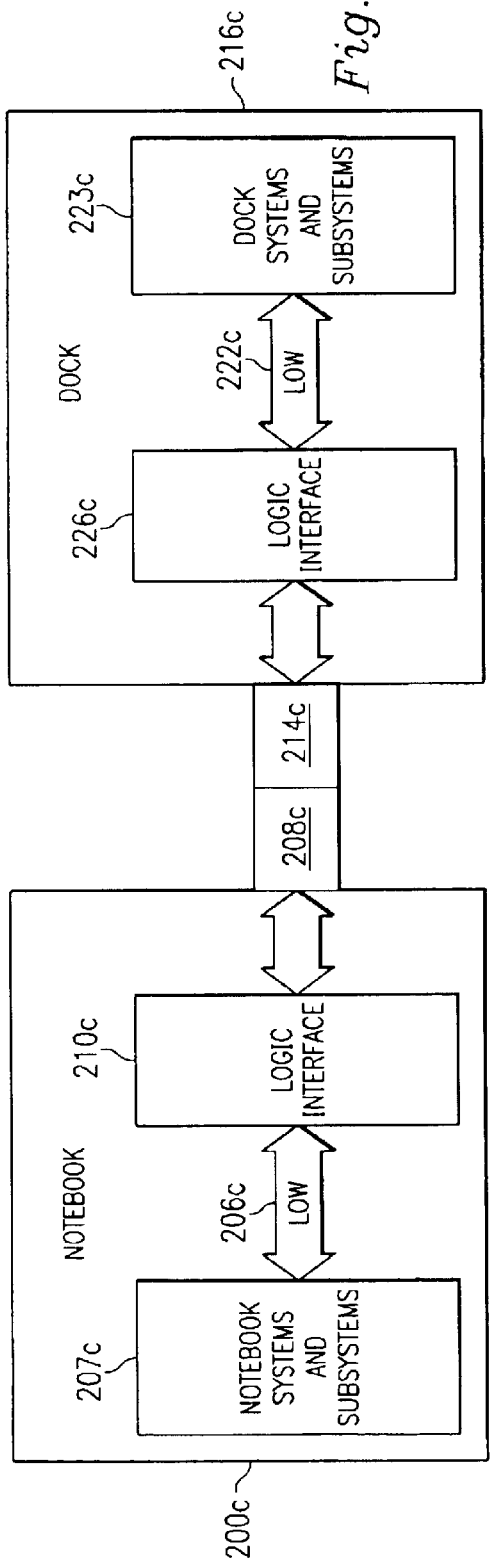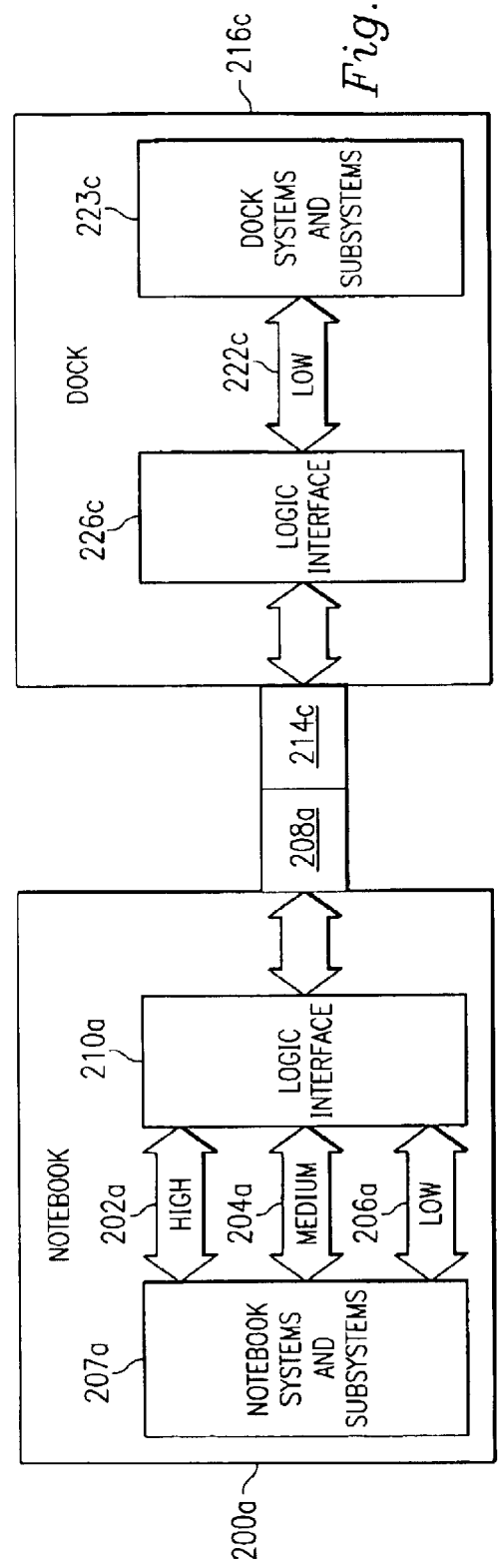

SCALABLE DOCKING ARCHITECTURE TO SUPPORT VARIOUS BANDWIDTH

BACKGROUND

The disclosures herein relate generally to portable computers and, more particularly, to a scalable architecture for portable computer docking stations.

USB docking device class integrated circuit ("IC") logic, as fully described in detail in related U.S. patent application Ser. No. 09/672,132 entitled "USB DOCKING DEVICE CLASS IC", filed Sep. 27, 2000, and hereby incorporated by reference in its entirety, enables the notebook and the docking solution to identify which carrier bandwidths are supported on both sides of the docking connector and settle on the greatest common denominator. Additionally, the signals combined on the single carrier can be programmed, in which case the docking solution and the notebook negotiate the features that are and are not supported in each individual case.

Docking solutions for portable computers, or "notebooks", are intended to perform several functions. Specifically, such solutions should provide cable management by replicating existing notebook functions and ports, add additional functionality, such as networking, SCSI ports, and a media bay, and enable users to add functionality, typically via PCI bus slots or PC card slots. The design generally used to accomplish these functions is to pass all necessary signals individually across a docking connector and into the docking solution.

The problem with this design methodology is that it is specific to each notebook and docking solution design pair. Each time a new notebook is designed, a decision must be made as to what features will be included in the notebook, the docking solution, and both. Hardware and software must then be developed to implement the required features. Another problem associated with this design methodology is that it requires a very large number of signals, some with different requirements, to be passed along a single docking connector. From a customer perspective, the above means that each time a new notebook is purchased, a new docking solution often must be purchased along with it.

The above-described problems have been mitigated by some manufacturers by their fixing docking solution architecture for all notebooks and docking solutions within a notebook family. For example, Dell Computer Corporation ("Dell") has fixed the docking solution architecture for all of its notebooks and docking stations since the introduction of the Latitude CP. In doing so, Dell has been able to leverage the development work done with the original C-Family design. This approach enables forward/backward compatibility, as well as compatibility up and down product lines; however, it has limited development to features and compromises that were in the initial docking solution design.

Further, to maintain docking commonality, notebooks targeted at different markets from performance to basic low-cost are limited by the features of the docking architecture or compromised by the cost impact of the docking architecture, respectively.

Therefore, what is needed is a scalable docking architecture for portable computers that does not necessitate the aforementioned compromises to be made in the docking solution.

SUMMARY

One embodiment, accordingly, is a scalable docking architecture for portable computers. Customer requirements for portable computers are grouped into logical functional groupings, which are further grouped into logical bandwidth levels. On the notebook side, all required signals for a specific logical functional grouping are combined into a single carrier with the necessary bandwidth for the signals within the logical bandwidth level. This combined signal is then passed through a docking connector. The individual signals are regenerated on the docking solution side of the connector.

A principle advantage of the embodiments is that, by enabling multiple bandwidths, products targeted at more cost-sensitive markets need not be compromised with the cost associated with unnecessary functionality, while products targeted at high-end markets not limited to the "mainstream" balance of features and cost. Moreover, new products can add additional features while maintaining forward and backward compatibility between notebook and docking solutions.

BRIEF DESCRIPTION OF THE DRAWINGS

FIGS. 2A–2E are system block diagrams of notebook/dock combinations embodying features of one embodiment.

DETAILED DESCRIPTION

Figures 1A, 1B:
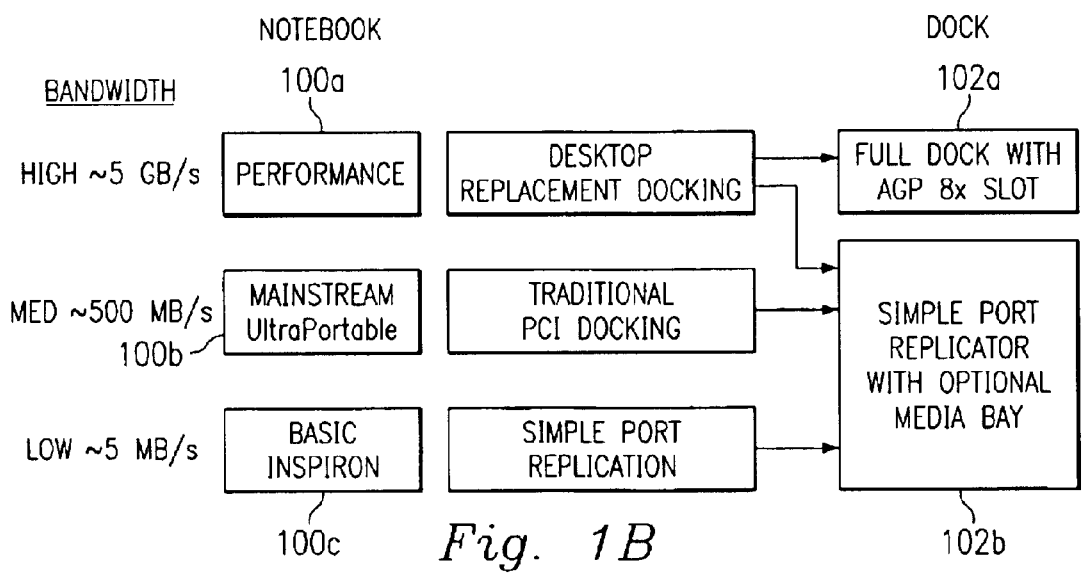
FIG. 1A is a table illustrating examples of potential notebook/dock groupings and bandwidth levels.
FIG. 1B is a block diagram of a potential implementation using the groupings illustrated in the table of FIG. 1A.

FIG. 1A is a table ("Table I") illustrating potential logical groupings and bandwidth levels of one embodiment. In particular, as shown in Table I, a first logical, or functional, grouping, referred to as "Simple Port Replication", encompasses the following customer required functions: replication of all ports on the notebook; communications functions; and required docking control sidebands. The bandwidth level of this functional grouping is "Low," defined in the illustrated embodiment as 5 megabytes/second ("Mbytes/s"). A second functional grouping, referred to as "PCI Docking", encompasses the following customer required functions: PCI bus; and IEEE1394 bus. The bandwidth level of this functional grouping is "Medium," defined in the illustrated embodiment as 500 Mbytes/s. A third functional grouping, referred to as "Desktop Replacement", encompasses the following customer required functions: Advanced Graphics Processor ("AGP") bus; and gigabit Ethernet. The bandwidth level of this functional grouping is "High," defined in the illustrated embodiment as 5 gigabytes/second ("Gbytes/s"). The bandwidth levels represent the maximum bandwidth supported within the level.

It should be noted that the bandwidth levels defined in FIG. 1A are illustrative only and that greater or fewer than three such levels may be defined as necessary. Moreover, the definitions of the levels themselves may be altered (e.g., "Low" could be defined as 500 Mbits/s; "Medium" could be defined as 300 Mbytes/s).

FIG. 1B illustrates a potential implementation of the definitions set forth in FIG. 1A. FIG. 1B illustrates three notebooks 100a, 100b, 100c, having different performance levels. Specifically, the notebook 100a is a high performance, or "high-end", system; the notebook 100b is a mid-level performance, or "mainstream", system; the notebook 100c is a basic, or "low-end", system. Applying the functional groupings set forth in FIG. 1A, the notebooks 100a, 100b, and 100c, are placed in the "Desktop Replacement Docking," "Traditional PCI Docking," and "Simple Port Replication" groupings, respectively. Two types of docks are represented in FIG. 1B, including a high-end dock 102a consisting of a full dock with an AGP 8× slot and a low-end dock 102b consisting of simple port replication with an optional media bay. In accordance with features of one embodiment, as described in greater detail below, any of the notebooks 100a, 100b, 100c, could be docked to the low-end dock 102b. Additionally, the notebook 100c could be advantageously docked to the high-end dock 102a. If, for example, the low-end notebook 100c were connected to the high-end dock 102a, the features of the docking station that are supported by the notebook would work; other features of the docking station would not work.

FIGS. 2A, 2B, and 2C are block diagrams representing various configurations of notebooks and docking stations according to one embodiment. Referring to FIG. 2A, a notebook 200a includes a plurality of buses encompassing three "bandwidth levels", as defined with reference to FIG. 1A. In particular, the notebook 200a includes one or more high bandwidth level buses, represented by a bus 202a, one or more medium bandwidth level buses, represented by a bus 204a, and one or more low bandwidth level buses, represented by a bus 206a. Although not shown in detail, it will be recognized that the buses enable communication with various devices and subsystems of the notebook 200a, collectively designated by a reference numeral 207a, in a conventional fashion. The buses 202a, 204a, and 206a, are connected to a docking connector 208a of the notebook 200a via a logic interface 210a, the function of which will be described in detail below.

The docking connector 208a is designed to mate with a complementary docking connector 214a disposed on a dock 216a. The dock 216a includes one or more high bandwidth level buses, represented by a bus 218a, one or more medium bandwidth level buses, represented by a bus 220a, and one or more low bandwidth level buses, represented by a bus 222a. Although not shown in detail, it will be recognized that the buses enable communication with various devices and subsystems connected to and disposed on and within the dock 216a, collectively designated by a reference numeral 223a, in a conventional fashion. The buses 218a, 220a, and 222a, are connected to the docking connector 214a of the dock 216a via a logic interface 226a, the function of which will be described in detail below.

In general, the function of the logic interface 210a is to encode signals received on the buses 202a, 204a, 206a, to be sent to the dock 216a, and to decode signals received from the dock to be sent to various subsystems and devices (not shown) of the notebook 200 via the buses 202a, 204a, 206a, in a conventional fashion. Similarly, the function of the logic interface 226a is to encode signals received on the buses 218a, 220a, and 222a, to be sent to the notebook 200a, and to decode signals received from the notebook via the docking connectors 208a, 224a, to be sent to various subsystems and devices (not shown) of the dock 216a via the buses 218a, 220a, 222a, in a conventional fashion.

In general, as previously indicated, the function of the each of the logic interfaces in each notebook and dock device is to encode signals transmitted by the device and decode signals received from the other device; to communicate the status of the device (e.g., docking status, the level of functionality of the connected devices); and to coordinate coherent transfer of signals between the devices.

FIGS. 2B and 2C respectively illustrate notebook/dock combinations that are similar to the combination illustrated in FIG. 2A, except that they each include a different combination of bus bandwidth levels. In addition, the identity of the logic interface thereof is different. In particular, FIG. 2B illustrates a notebook 200b including a plurality of buses encompassing two "bandwidth levels". In particular, the notebook 200b includes one or more medium bandwidth level buses, represented by a bus 204b, and one or more low bandwidth level buses, represented by a bus 206b. Although not shown in detail, it will be recognized that the buses enable communication with various devices and subsystems of the notebook 200b, collectively designated by a reference numeral 207b, in a conventional fashion. The buses 204b, and 206b, are connected to a docking connector 208b of the notebook 200b via a logic interface 210b.

The docking connector 208b is designed to mate with a complementary docking connector 214b disposed on a dock 216b. The dock 216b includes one or more medium bandwidth level buses, represented by a bus 220b, and one or more low bandwidth level buses, represented by a bus 222b. Although not shown in detail, it will be recognized that the buses enable communication with various devices and subsystems connected to and disposed on and within the dock 216b, collectively designated by a reference numeral 223b, in a conventional fashion. The buses 220b, and 222b, are connected to the docking connector 244b of the dock 216b via a logic interface 226b.

FIG. 2C illustrates a notebook 200c including a plurality of buses encompassing one bandwidth level. In particular, the notebook 200c includes one or more low bandwidth level buses, represented by a bus 206c. Although not shown in detail, it will be recognized that the buses enable communication with various devices and subsystems of the notebook 200c, collectively designated by a reference numeral 207c, in a conventional fashion. The buses 206c, are connected to a docking connector 208c of the notebook 200c via a logic interface 210c.

The docking connector 208c is designed to mate with a complementary docking connector 214c disposed on a dock 216c. The dock 216c includes one or more low bandwidth level buses, represented by a bus 222c. Although not shown in detail, it will be recognized that the buses enable communication with various devices and subsystems connected to and disposed on and within the dock 216c, collectively designated by a reference numeral 223c, in a conventional fashion. The buses 222c, are connected to the docking connector 214c of the dock 216c via a logic interface 226c.

In accordance with features of the embodiments described herein, a primary feature and function of the logic interfaces 210a, 210b, 210c, 226a, 226b, 226c, is that they enable any of the notebooks 200a, 200b, 200c, to be docked to any of the docks 216a, 216b, 216c, and function properly, as the logic interfaces are capable of handling signals that are not useable by the respective devices and, potentially generating necessary signals that may not be present from signals that are present.

Figure 2E:
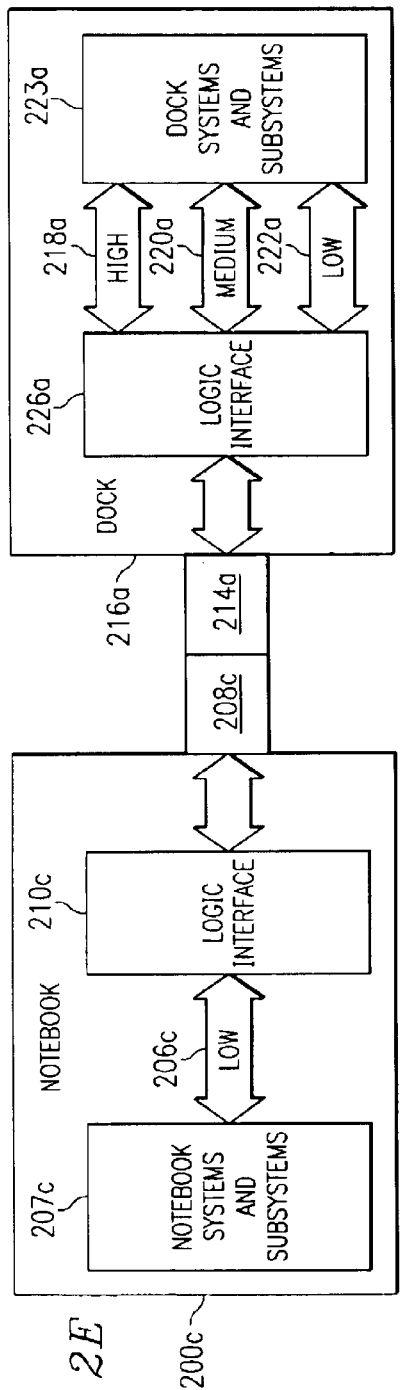

FIGS. 2D and 2E are block diagrams illustrating the high-end notebook 200a coupled to the low-end dock 216c and the low-end notebook 200c coupled to the high-end dock 216a, respectively. As previously indicated, the logic interfaces 210a, 210c, 226a, 226c, on the respective notebook and dock enable the respective device to identify which carrier bandwidths are supported on both sides of the docking connector and settle on the greatest common denominator.

In addition, the embodiments illustrated are intended to be illustrative, not all-inclusive, as it is anticipated that there will be cases in which it would be beneficial to provide combinations of bandwidth levels other than those shown (e.g., high and low with no medium; high and medium with no low) in notebooks and docks. Still further, the definitions of what constitutes "high," "medium," and "low" bandwidth levels is meant to be illustrative and it is anticipated that these definitions will change, perhaps rapidly, as notebook and dock products evolve over time. It is also anticipated that there may be more than three such divisions of bandwidth levels.

Taking all of the foregoing into account, the basic premise of the embodiments described herein is that, regardless of the number of how the bandwidth levels are defined and what combinations of bandwidth level buses are provided in the products, notebooks and docks designed in accordance with the described embodiments will be interchangeable.

It will be recognized that, especially in the case of a high-performance notebook (e.g., the notebook 200a), the notebook will include functionality that will not be useful unless the notebook is docked to a dock that can implement that functionality. It will be further recognized that implementation of functionality that is not used results in unnecessary increase in power consumption and temperature of the notebook, further resulting in unnecessary strain on notebook resources and capacity. Therefore, in accordance with features of the embodiments described herein, a primary function of the logic interface on the notebook side is to detect which buses are present and enable functionality and switching based on the detected environment (e.g., connectivity).

Figure 3:
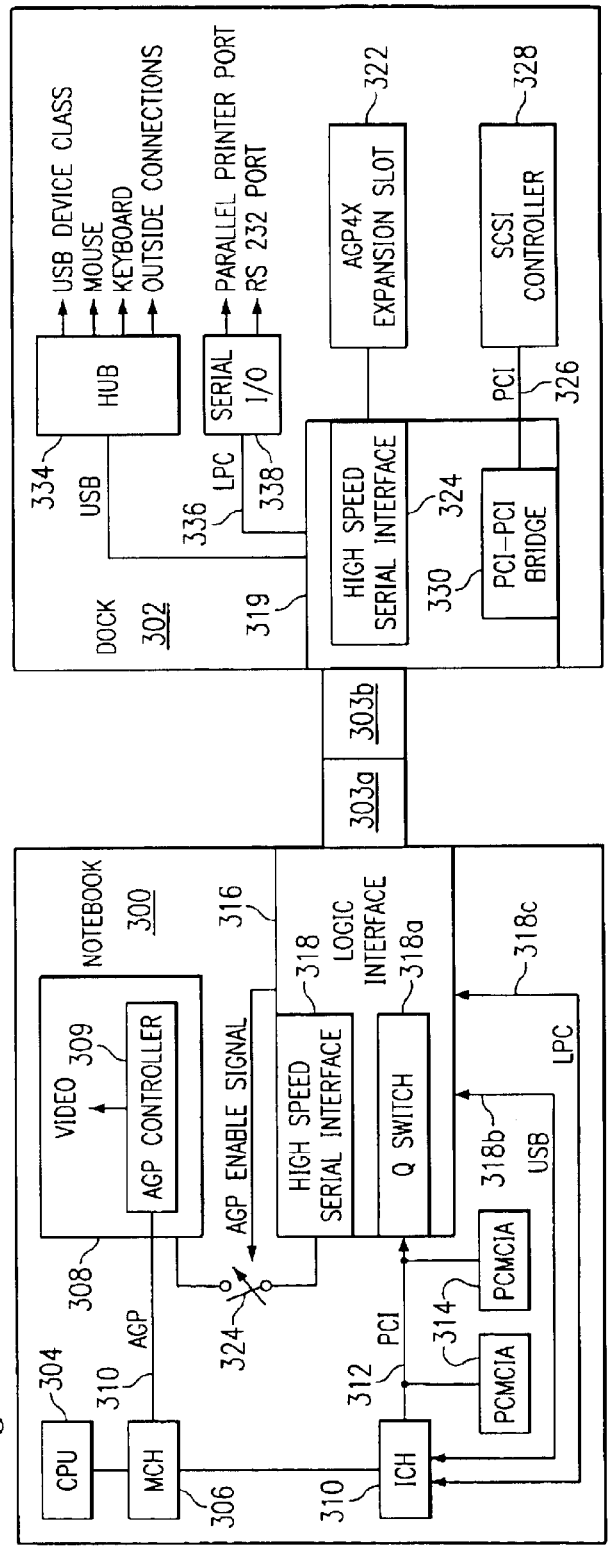
FIG. 3 is a system block diagram of a notebook/dock combination embodying a power-saving feature of one embodiment.

For example, FIG. 3 illustrates a notebook 300 and a dock 302 interconnected via docking connectors 303a, 303b and embodying an AGP link implementation of one embodiment. As shown in FIG. 3, the notebook 300 includes a CPU 304, connected to a memory control hub ("MCH"), or "North Bridge", 306 in a conventional fashion. The MCH 306 is connected to a video subsystem 308 including an AGP controller 309 via an AGP bus 310, defined herein as a "high bandwidth" bus. The MCH 306 is further connected to an "ICH", or "South Bridge," 310 in a conventional fashion. The South Bridge 310 is connected via a PCI bus 312, defined herein as a "medium bandwidth" bus, to one or more PCMCIA expansion slots 314 for receiving expansion cards (not shown). The AGP controller 309 is connected to a logic interface 316 of the notebook 300 via a high speed serial interface 318, which in a preferred embodiment is integrated into the logic interface 316. Similarly, the PCI bus 312 is connected to the logic interface 316 via a Q-switch 318a, which in a preferred embodiment is integrated into the logic interface 316. Two "low bandwidth" buses, including a USB bus 318b and an LPC bus 318c are also provided in the notebook 300 and connected to the logic interface 300.

On the dock 302 side, a logic interface 319 is connected via an AGP bus 320 to an AGP 4× expansion slot 322 via a high-speed serial interface 324 integrated into the logic interface 319. Similarly, the logic interface 319 is connected via a PCI bus 326 to a SCSI controller 328 via a PCI-to-PCI bridge 330 integrated into the logic interface 319. Still further, the logic interface is connected via a USB bus 332 to a hub 334 and via an LPC bus 336 to a serial I/O controller 338.

In a preferred embodiment, the logic interface 316 is capable of detecting whether or not the notebook 300 is docked to an AGP-capable dock (i.e., a dock in the "Desktop Replacement Docking" functional grouping), such as the dock 302. If so, an AGP enable signal from the interface 316 switches the high speed serial interface 318 into the circuit; e.g., by closing a switch 324; otherwise, the AGP enable signal switches the high speed serial interface 318 out of the circuit; e.g., by opening the switch 324. In this manner, when the high speed serial interface 318, which consumes a great deal of power and generates a great deal of heat, is not needed (i.e., when the notebook 300 is not docked or is docked to a non-AGP-capable dock), it is switched off; otherwise, it is switched on.

As can be seen, the principal advantage of the embodiments is that they enable multiple notebooks to be docked to multiple docks and function properly. Another advantage is that the environment of the notebook can be determined and automatically accounted for, in terms of reduction in power consumption and thermal production, thereby reducing unnecessary stress on notebook resources.

Although illustrative embodiments have been shown and described, a wide range of modification, change and substitution is contemplated in the foregoing disclosure and in some instances, some features of the embodiment may be employed without a corresponding use of other features. Accordingly, it is appropriate that the appended claims be construed broadly and in a manner consistent with the scope of the embodiments disclosed herein.

What is claimed is:

1. A computer docking system comprising:

a portable computer including a CPU, at least one first communications bus, a first logic interface electrically connected to the at least one first communications bus, and a first docking connector electrically connected to the first logic interface; and a dock including a second docking connector for mating with the first docking connector, a second logic interface electrically connected to the second docking connector, and at least one second communications bus electrically connected to the second logic interface;

wherein the first logic interface determines a carrier bandwidth of the at least one second bus and the second logic interface determines a carrier bandwidth of the at least one first bus;

wherein upon determining the respective carrier bandwidths of the at least one first and second communications buses, the first and second logic interfaces determine a maximum carrier bandwidth supported by both the dock and the portable computer for use in communications between the dock and the portable computer; and wherein the first logic interface encodes signals to be transmitted to and decodes signals received from the dock via the first and second docking connectors and the second logic interface encodes signals to be transmitted to and decodes signals received from the portable computer via the first and second docking connectors.

2. The computer docking system of claim 1 wherein the first logic interface determines whether the dock includes a predefined capability and, if the dock includes the predefined capability, the first logic interface causes a corresponding capability in the portable computer to be enabled.

3. The computer docking system of claim 2 wherein if the dock does not include the predefined capability, the first logic interface causes the corresponding capability in the portable computer to be disabled.

4. The computer docking system of claim 1 wherein the at least one first communications bus comprises one or more first communications buses each having a different carrier bandwidth.

5. The computer docking system of claim 4 wherein the carrier bandwidth of each of the first communications buses is selected from a group consisting of high bandwidth, medium bandwidth, and low bandwidth.

6. The computer docking system of claim 5 wherein low bandwidth is defined as a bandwidth of 5 megabytes, medium bandwidth is defined as a bandwidth of 500 megabytes, and high bandwidth is defined as a bandwidth of 5 gigabytes.

7. The computer docking system of claim 1 wherein the at least one second communications bus comprises one or more second communications buses each having a different carrier bandwidth.

8. The computer docking system of claim 7 wherein the carrier bandwidth of each of the second communications buses is selected from a group consisting of high bandwidth, medium bandwidth, and low bandwidth.

9. A computer system for connection to a dock comprising:
- a CPU;
- at least one first communications bus;
- a first logic interface electrically connected to the at least one first communications bus; and
- a first docking connector electrically connected to the first logic interface for electrical connection to a second docking connector of the dock;
- wherein when the computer system is connected to the dock via the first and second docking connectors, the first logic interface determines a carrier bandwidth of at least one second communications bus of the dock;
- wherein upon determining respective carrier bandwidths of the at least one first and second communications buses, the first logic interface determines a maximum carrier bandwidth supported by both the dock and the computer system for use in communications between the dock and the computer system; and
- wherein the first logic interface encodes signals to be transmitted to and decodes signals received from the dock via the first and second docking connectors.

10. The computer system of claim 9 wherein the first logic interface determines whether the computer system is connected to the dock and whether the dock includes a predefined capability and, if the computer system is connected to the dock and the dock includes the predefined capability, the first logic interface causes a corresponding capability in the computer system to be enabled.

11. The computer system of claim 10 wherein if the computer system is not connected to the dock or the dock does not include the predefined capability, the first logic interface causes the corresponding capability in the computer system to be disabled.

12. The computer system of claim 11 wherein the predefined capability comprises AGP-support.

13. The computer system of claim 12 wherein, if the computer system is connected to the dock and the dock includes AGP support, the first logic interface generates an AGP enable signal for switching on a high-speed interface connected between an AGP controller of the computer system and the first logic interface.

14. The computer system of claim 9 wherein the at least one first communications bus comprises one or more buses selected from a group consisting of high, medium, and low carrier bandwidth buses, and wherein the dock includes at least one second communications bus comprising one or more buses selected from a group consisting of high, medium, and low carrier bandwidth buses.

15. The computer system of claim 14 wherein low carrier bandwidth is defined as a bandwidth of 5 megabytes, medium carrier bandwidth is defined as a bandwidth of 500 megabytes, and high carrier bandwidth is defined as a bandwidth of 5 gigabytes.

16. A dock for connecting to a portable computer, the dock comprising:
- a first docking connector for mating with a second docking connector of the portable computer;
- a first logic interface electrically connected to the first docking connector; and
- at least one first communications bus electrically connected to the first logic interface;
- wherein when the portable computer is connected to the dock via the first and second docking connectors, the first logic interface determines a carrier bandwidth of at least one second communications bus of the portable computer;
- wherein upon determining the respective carrier bandwidths of the at least one first and second communications buses, the first logic interface determines a maximum carrier bandwidth supported by both the dock and the portable computer for use in communications between the dock and the portable computer; and
- wherein the first logic interface encodes signals to be transmitted to and decodes signals received from the portable computer via the first and second docking connectors.

17. The dock of claim 16 wherein the at least one first communications bus comprises one or more buses selected from a group consisting of high, medium, and low carrier bandwidth buses, and wherein the dock includes at least one second communications bus comprising one or more buses selected from a group consisting of high, medium, and low carrier bandwidth buses.

18. The dock of claim 17 wherein low carrier bandwidth is defined as a bandwidth of 5 megabytes, medium carrier bandwidth is defined as a bandwidth of 500 megabytes, and high carrier bandwidth is defined as a bandwidth of 5 gigabytes.

19. A method of implementing a scalable docking architecture for portable computers, the method comprising:
- including in a portable computer a first logic interface, wherein the first logic interface is electrically connected between a first communications bus of the portable computer and a first docking connector;
- including in a dock electrically connectable to the portable computer via a second docking connector designed for mating with the first docking connector a second logic interface, wherein the second logic interface is electrically connected between a second communications bus of the dock and the second docking connector;
- the first logic interface determining capabilities of the dock, including a carrier bandwidth of the second communications bus;
- the second logic interface determining capabilities of the portable computer, including a carrier bandwidth of the first communications bus;
- the first and second logic interfaces determining a greatest common carrier bandwidth supported by both the portable computer and the dock;
- the first logic interface encoding signals to be sent to and decoding signals received from the dock; and the second logic interface encoding signals to be sent to and decoding signals received from the portable computer.

20. The method of claim 19 further comprising:

the first first logic interface determining whether the dock includes a predefined capability and, if the dock includes the predefined capability, causing a corresponding capability in the portable computer to be enabled.

21. The method of claim 20 further comprising:

if the dock does not include the predefined capability, the first logic interface causing the corresponding capability in the portable computer to be disabled.

22. The method of claim 19 wherein the first communications bus comprises one or more first communications buses each having a different carrier bandwidth.

23. The method of claim 22 wherein the carrier bandwidth of each of the first communications buses is selected from a group consisting of high bandwidth, medium bandwidth, and low bandwidth.

24. The method of claim 19 wherein the second communications bus comprises one or more second communications buses each having a different carrier bandwidth.

25. The method of claim 24 wherein the carrier bandwidth of each of the second communications buses is selected from a group consisting of high bandwidth, medium bandwidth, and low bandwidth.

26. A computer system for connection to a dock comprising:

a microprocessor in the system;

a storage coupled to the microprocessor;

a first communications bus in the system;

a first logic interface coupled to the first communications bus;

a first docking connector coupled to the first logic interface for coupling to a second docking connector of the dock;

wherein when the computer system is connected to the dock via the first and second docking connectors, the first logic interface determines a carrier bandwidth of a second communications bus of the dock;

wherein upon determining respective carrier bandwidths of the first and second communications buses, the first logic interface determines a maximum carrier bandwidth supported by both the dock and the system for use in communications between the dock and the system; and wherein the first logic interface encodes signals to be transmitted to and decodes signals received from the dock via the first and second docking connectors.

* * * * *